United States Patent
Johnson et al.

(10) Patent No.: US 8,776,566 B2
(45) Date of Patent: Jul. 15, 2014

(54) ELECTROMAGNETIC FORMING OF METALLIC GLASSES USING A CAPACITIVE DISCHARGE AND MAGNETIC FIELD

(71) Applicant: California Institute of Technology, Pasadena, CA (US)

(72) Inventors: William L. Johnson, San Marino, CA (US); Georg Kaltenboeck, Pasadena, CA (US); Marios D. Demetriou, West Hollywood, CA (US); Scott N. Roberts, Altadena, CA (US); Konrad Samwer, Goettingen (DE)

(73) Assignee: California Institute of Technology, Pasadena, CA (US)

(*) Notice: Subject to any disclaimer, the term of this patent is extended or adjusted under 35 U.S.C. 154(b) by 0 days.

(21) Appl. No.: 13/960,558

(22) Filed: Aug. 6, 2013

(65) Prior Publication Data

US 2013/0319062 A1 Dec. 5, 2013

Related U.S. Application Data

(63) Continuation of application No. 13/083,307, filed on Apr. 8, 2011, now Pat. No. 8,499,598.

(60) Provisional application No. 61/322,209, filed on Apr. 8, 2010.

(51) Int. Cl.
*B21K 17/00* (2006.01)
*C22C 45/00* (2006.01)

(52) U.S. Cl.
USPC ............... 72/54; 72/700; 148/403; 148/561

(58) Field of Classification Search
USPC ............... 72/54, 56, 333, 336, 363, 364, 700; 148/403, 561, 562, 672; 29/419.2, 29/522.1; 473/342
See application file for complete search history.

(56) References Cited

U.S. PATENT DOCUMENTS 3,332,747 A   7/1967   Bundy
3,537,045 A   10/1970  Ichiro
(Continued)

FOREIGN PATENT DOCUMENTS

FR   2806019      9/2001
JP   63-220950    9/1988
(Continued)

OTHER PUBLICATIONS

International Search Report and Written Opinion dated Dec. 23, 2011, PCT/US2011/031804, 6 pages.
(Continued)

*Primary Examiner* — David B Jones
(74) *Attorney, Agent, or Firm* — Polsinelli PC

(57) ABSTRACT

An apparatus and method of uniformly heating, rheologically softening, and thermoplastically forming metallic glasses rapidly into a net shape using a rapid capacitor discharge forming (RCDF) tool in combination with an electromagnetic force generated by the interaction of the applied current with a transverse magnetic field. The RCDF method utilizes the discharge of electrical energy stored in a capacitor to uniformly and rapidly heat a sample or charge of metallic glass alloy to a predetermined "process temperature" between the glass transition temperature of the amorphous metal and the equilibrium melting point of the alloy in a time scale of several milliseconds or less, at which point the interaction between the electric field and the magnetic field generates a force capable of shaping the heated sample into a high quality amorphous bulk article via any number of techniques including, for example, injection molding, dynamic forging, stamp forging, and blow molding in a time scale of less than one second.

20 Claims, 8 Drawing Sheets

(56) References Cited

U.S. PATENT DOCUMENTS

| | | |
|---|---|---|
| 3,863,700 A | 2/1975 | Bedell et al. |
| 4,115,682 A | 9/1978 | Kavesh et al. |
| 4,355,221 A | 10/1982 | Lin |
| 4,715,906 A | 12/1987 | Taub et al. |
| 4,809,411 A | 3/1989 | Lin et al. |
| 4,950,337 A | 8/1990 | Li et al. |
| 5,005,456 A | 4/1991 | Ballard et al. |
| 5,075,051 A | 12/1991 | Ito et al. |
| 5,278,377 A | 1/1994 | Tsai |
| 5,288,344 A | 2/1994 | Peker et al. |
| 5,324,368 A | 6/1994 | Masumoto et al. |
| 5,368,659 A | 11/1994 | Peker et al. |
| 5,554,838 A | 9/1996 | Berdich |
| 5,618,359 A | 4/1997 | Lin et al. |
| 5,735,975 A | 4/1998 | Lin et al. |
| 5,896,642 A | 4/1999 | Peker et al. |
| 6,027,586 A | 2/2000 | Masumoto et al. |
| 6,235,381 B1 | 5/2001 | Sanders et al. |
| 6,258,183 B1 | 7/2001 | Onuki et al. |
| 6,293,155 B1 | 9/2001 | Babiel |
| 6,355,361 B1 | 3/2002 | Ueno et al. |
| 6,432,350 B1 | 8/2002 | Seres et al. |
| 6,771,490 B2 | 8/2004 | Peker et al. |
| 6,875,293 B2 | 4/2005 | Peker |
| 7,120,185 B1 | 10/2006 | Richards |
| 7,506,566 B2 | 3/2009 | Decristofaro et al. |
| 7,883,592 B2 | 2/2011 | Hofmann et al. |
| 8,276,426 B2 | 10/2012 | Musat et al. |
| 8,499,598 B2 * | 8/2013 | Johnson et al. ............ 72/54 |
| 2001/0033304 A1 | 10/2001 | Ishinaga et al. |
| 2003/0183310 A1 | 10/2003 | McRae |
| 2004/0035502 A1 | 2/2004 | Kang et al. |
| 2005/0034787 A1 | 2/2005 | Song et al. |
| 2005/0103271 A1 | 5/2005 | Watanabe et al. |
| 2005/0202656 A1 | 9/2005 | Ito et al. |
| 2005/0236071 A1 | 10/2005 | Koshiba et al. |
| 2006/0102315 A1 | 5/2006 | Lee et al. |
| 2006/0293162 A1 | 12/2006 | Ellison |
| 2007/0003782 A1 | 1/2007 | Collier |
| 2007/0034304 A1 | 2/2007 | Inoue et al. |
| 2008/0081213 A1 | 4/2008 | Ito et al. |
| 2008/0135138 A1 | 6/2008 | Duan et al. |
| 2008/0302775 A1 | 12/2008 | Machrowicz |
| 2009/0236017 A1 | 9/2009 | Johnson et al. |
| 2010/0009212 A1 | 1/2010 | Utsunomiya et al. |
| 2010/0047376 A1 | 2/2010 | Imbeau et al. |
| 2010/0121471 A1 | 5/2010 | Higo et al. |
| 2010/0320195 A1 | 12/2010 | Fujita et al. |
| 2012/0006085 A1 | 1/2012 | Johnson et al. |
| 2012/0103478 A1 | 5/2012 | Johnson et al. |
| 2012/0132625 A1 | 5/2012 | Kaltenboeck et al. |
| 2012/0255338 A1 | 10/2012 | Johnson et al. |
| 2013/0001222 A1 | 1/2013 | Kaltenboeck et al. |
| 2013/0025814 A1 | 1/2013 | Demetriou et al. |

FOREIGN PATENT DOCUMENTS

| | | |
|---|---|---|
| JP | 11-001729 | 1/1999 |
| KR | 10-0271356 | 11/2000 |
| WO | WO 2009/117735 | 9/2009 |
| WO | WO 2011/127414 | 10/2011 |
| WO | WO 2012/051443 | 4/2012 |
| WO | WO 2012/092208 | 7/2012 |
| WO | WO 2012/103552 | 8/2012 |
| WO | WO 2012/112656 | 8/2012 |

OTHER PUBLICATIONS

Document cited and published during Applicant Interview Summary conducted on Jan. 29, 2013, Marios Demetriou, 20 pages.

De Oliveira et al., "Electromechanical engraving and writing on bulk metallic glasses", Applied Physics Letters, Aug. 26, 2002, vol. 81, No. 9, pp. 1606-1608.

Duan et al., "Bulk Metallic Glass with Benchmark Thermoplastic Processability", Adv. Mater., 2007, vol. 19, pp. 4272-4275.

Ehrt et al., "Electrical conductivity and viscosity of borosilicate glasses and melts,"Phys. Chem. Glasses: Eur. J. Glass Sci. Technol. B, Jun. 2009, 50(3), pp. 165-171.

Love, "Temperature dependence of electrical conductivity and the probability density function," J. Phys. C: Solid State Phys., 16, 1983, pp. 5985-5993.

Mattern et al., "Structural behavior and glass transition of bulk metallic glasses, "Journal of Non-Crystalline Solids, 345&346, 2004, pp. 758-761.

Wiest et al., "Zi-Ti-based Be-bearing glasses optimized for high thermal stability and thermoplastic formability", Acta Materialia, 2008, vol. 56, pp. 2625-2630.

Yavari et al., "Electromechanical shaping, assembly and engraving of bulk metallic glasses", Materials Science and Engineering A, 2004, vol. 375-377, pp. 227-234.

Yavari et al., "Shaping of Bulk Metallic Glasses by Simultaneous Application of Electrical Current and Low Stress", Mat. Res. Soc. Symp. Proc., 2001, vol. 644, pp. L12.20.1-L12.20.6.

U.S. Appl. No. 14/045,667, filed Oct. 3, 2013, Johnson et al.
U.S. Appl. No. 14/054,545, filed Oct. 15, 2013, Johnson et al.
U.S. Appl. No. 14/054,648, filed Oct. 15, 2013, Kaltenboeck et al.
U.S. Appl. No. 14/057,500, filed Oct. 18, 2013, Kaltenboeck et al.

* cited by examiner

ELECTROMAGNETIC FORMING OF METALLIC GLASSES USING A CAPACITIVE DISCHARGE AND MAGNETIC FIELD

CROSS-REFERENCE TO RELATED APPLICATIONS

This current application is a continuation of U.S. patent application Ser. No. 13/083,307, filed on Apr. 8, 2011, now U.S. Pat. No. 8,499,598, which claims priority to U.S. Provisional Application No. 61/322,209, filed Apr. 8, 2010, both of which are incorporated herein by reference as if fully disclosed.

FIELD OF THE INVENTION

This invention relates generally to a novel method of forming metallic glass; and more particularly to a process for forming metallic glass using rapid capacitor discharge heating and a magnetic field to apply an electromagnetic forming force.

BACKGROUND OF THE INVENTION

Amorphous materials are a new class of engineering material, which have a unique combination of high strength, elasticity, corrosion resistance and processability from the molten state. Amorphous materials differ from conventional crystalline alloys in that their atomic structure lacks the typical long-range ordered patterns of the atomic structure of conventional crystalline alloys. Amorphous materials are generally processed and formed by cooling a molten alloy from above the melting temperature of the crystalline phase (or the thermodynamic melting temperature) to below the "glass transition temperature" of the amorphous phase at "sufficiently fast" cooling rates, such that the nucleation and growth of alloy crystals is avoided. As such, the processing methods for amorphous alloys have always been concerned with quantifying the "sufficiently fast cooling rate", which is also referred to as "critical cooling rate", to ensure formation of the amorphous phase.

The "critical cooling rates" for early amorphous materials were extremely high, on the order of $10^{6\circ}$ C./sec. As such, conventional casting processes were not suitable for such high cooling rates, and special casting processes such as melt spinning and planar flow casting were developed. Due to the crystallization kinetics of those early alloys being substantially fast, extremely short time (on the order of $10^{-3}$ seconds or less) for heat extraction from the molten alloy were required to bypass crystallization, and thus early amorphous alloys were also limited in size in at least one dimension. For example, only very thin foils and ribbons (order of 25 microns in thickness) were successfully produced using these conventional techniques. Because the critical cooling rate requirements for these amorphous alloys severely limited the size of parts made from amorphous alloys, the use of early amorphous alloys as bulk objects and articles was limited.

Over the years it was determined that the "critical cooling rate" depends strongly on the chemical composition of amorphous alloys. Accordingly, a great deal of research was focused on developing new alloy compositions with much lower critical cooling rates. Examples of these alloys are given in U.S. Pat. Nos. 5,288,344; 5,368,659; 5,618,359; and 5,735,975, each of which is incorporated herein by reference. These amorphous alloy systems, also called bulk-metallic glasses or BMGs, are characterized by critical cooling rates as low as a few ° C./second, which allows the processing and forming of much larger bulk amorphous phase objects than were previously achievable.

With the availability of low "critical cooling rate" BMGs, it has become possible to apply conventional casting processes to form bulk articles having an amorphous phase. Over the past several years, a number of companies, including LiquidMetal Technologies, Inc. have undertaken an effort to develop commercial manufacturing technologies for the production of net shape metallic parts fabricated from BMGs. For example, manufacturing methods such as permanent mold metal die-casting and injection casting into heated molds are currently being used to fabricate commercial hardware and components such as electronic casings for standard consumer electronic devices (e.g., cell phones and handheld wireless devices), hinges, fasteners, medical instruments and other high value added products. However, even though bulk-solidifying amorphous alloys provide some remedy to the fundamental deficiencies of solidification casting, and particularly to the die-casting and permanent mold casting processes, as discussed above, there are still issues which need to be addressed. First and foremost, there is a need to make these bulk objects from a broader range of alloy compositions. For example, presently available BMGs with large critical casting dimensions capable of making large bulk amorphous objects are limited to a few groups of alloy compositions based on a very narrow selection of metals, including Zr-based alloys with additions of Ti, Ni, Cu, Al and Be and Pd-based alloys with additions of Ni, Cu, and P, which are not necessarily optimized from either an engineering or cost perspective.

In addition, the current processing technology requires a great deal of expensive machinery to ensure appropriate processing conditions are created. For example, most shaping processes require a high vacuum or controlled inert gas environment, induction melting of material in a crucible, pouring of metal to a shot sleeve, and pneumatic injection through a shot sleeve into gating and cavities of a rather elaborate mold assembly. These modified die-casting machines can cost several hundreds of thousands of dollars per machine. Moreover, because heating a BMG has to date been accomplished via these traditional, slow thermal processes, the prior art of processing and forming bulk-solidifying amorphous alloys has always been focused on cooling the molten alloy from above the thermodynamic melting temperature to below the glass transition temperature. This cooling has either been realized using a single-step monotonous cooling operation or a multi-step process. For example, metallic molds (made of copper, steel, tungsten, molybdenum, composites thereof, or other high conductivity materials) at ambient temperatures are utilized to facilitate and expedite heat extraction from the molten alloy. Because the "critical casting dimension" is correlated to the critical cooling rate, these conventional processes are not suitable for forming larger bulk objects and articles of a broader range of bulk-solidifying amorphous alloys. In addition, it is often necessary to inject the molten alloy into the dies at high-speed, and under high-pressure, to ensure sufficient alloy material is introduced into the die prior to the solidification of the alloy, particularly in the manufacture of complex and high-precision parts. Because the metal is fed into the die under high pressure and at high velocities, such as in high-pressure die-casting operation, the flow of the molten metal becomes prone to Rayleigh-Taylor instability. This flow instability is characterized by a high Weber number, and is associated with the break-up of the flow front causing the formation of protruded seams and cells, which appear as cosmetic and structural micro-defects in cast parts. Also, there is a tendency to form a shrinkage cavity or porosity along the centerline of the die-casting mold when unvitrified liquid is trapped inside a solid shell of vitrified metal.

Attempts to remedy the problems associated with rapidly cooling the material from above the equilibrium melting point to below the glass transition were mostly focused on utilizing the kinetic stability and viscous flow characteristics of the supercooled liquid. Methods have been proposed that involve heating glassy feedstock above the glass transition where the glass relaxes to a viscous supercooled liquid, applying pressure to form the supercooled liquid, and subsequently cooling to below glass transition prior to crystallizing. These attractive methods are essentially very similar to those used to process plastics. In contrast to plastics however, which remain stable against crystallization above the softening transition for extremely long periods of time, metallic supercooled liquids crystallize rather rapidly once relaxed at the glass transition. Consequently, the temperature range over which metallic glasses are stable against crystallization when heated at conventional heating rates (20° C./min) are rather small (50-100° C. above glass transition), and the liquid viscosity within that range is rather high ($10^9$-$10^7$ Pa s). Owing to these high viscosities, the pressures required to form these liquids into desirable shapes are enormous, and for many metallic glass alloys could exceed the pressures attainable by conventional high strength tooling (<1 GPa). Metallic glass alloys have recently been developed that are stable against crystallization when heated at conventional heating rates up to considerably high temperatures (165° C. above glass transition). Examples of these alloys are given in U.S. Pat. Appl. 20080135138 and articles to G. Duan et al. (Advanced Materials, 19 (2007) 4272) and A. Wiest (Act Materialia, 56 (2008) 2525-2630), each of which is incorporated herein by reference. Owing to their high stability against crystallization, process viscosities as low as $10^5$ Pa-s become accessible, which suggests that these alloys are more suitable for processing in the supercooled liquid state than traditional metallic glasses. These viscosities however are still substantially higher than the processing viscosities of plastics, which typically range between 10 and 1000 Pa-s. In order to attain such low viscosities, the metallic glass alloy should either exhibit an even higher stability against crystallization when heated by conventional heating, or be heated at an unconventionally high heating rate which would extend the temperature range of stability and lower the process viscosity to values typical of those used in processing thermoplastics.

A few attempts have been made to create a method of instantaneously heating a BMG up to a temperature sufficient for shaping, thereby avoiding many of the problems discussed above and simultaneously expanding the types of amorphous materials that can be shaped. For example, U.S. Pat. Nos. 4,115,682 and 5,005,456 and articles to A. R. Yavari (Materials Research Society Symposium Proceedings, 644 (2001) L12-20-1, Materials Science & Engineering A, 375-377 (2004) 227-234; and Applied Physics Letters, 81(9) (2002) 1606-1608), the disclosures of each of which are incorporated herein by reference, all take advantage of the unique conductive properties of amorphous materials to instantaneously heat the materials to a shaping temperature using Joule heating. However, thus far these techniques have focused on localized heating of BMG samples to allow for only localized forming, such as the joining (i.e., spot welding) of such pieces, or the formation of surface features. None of these prior art methods teach how to uniformly heat the entire BMG specimen volume in order to be able to perform global forming. Instead, all those prior art methods anticipate temperature gradients during heating, and discuss how these gradients could affect local forming. For instance, Yavari et al. (Materials Research Society Symposium Proceedings, 644 (2001) L12-20-1) write: The external surfaces of the BMG specimen being shaped, whether in contact with the electrodes or with the ambient (inert) gas in the shaping chamber, will be slightly cooler than the inside as the heat generated by the current dissipates out of the sample by conduction, convection or radiation. On the other hand, the outer surfaces of samples heated by conduction, convection or radiation are slightly hotter than the inside. This is an important advantage for the present method as crystallization and or oxidation of metallic glasses often begin first on outer surfaces and interfaces and if they are slightly below the temperature of the bulk, such undesirable surface crystal formation may be more easily avoided."

Another drawback of the limited stability of BMGs against crystallization above the glass transition is the inability to measure thermodynamic and transport properties, such as heat capacity and viscosity, over the entire range of temperatures of the metastable supercooled liquid. Typical measurement instruments such as Differential Scanning calorimeters, Thermo-Mechanical Analyzers, and Coquette Viscometers rely on conventional heating instrumentation, such as electric and induction heaters, and are thus capable of attaining sample heating rates that are considered conventional (typically <100° C./min). As discuss above, metallic supercooled liquids can be stable against crystallization over a limited temperature range when heated at a conventional heating rate, and thus the measureable thermodynamic and transport properties are limited to within the accessible temperature range. Consequently, unlike polymer and organic liquids which are very stable against crystallization and their thermodynamic and transport properties are measureable throughout the entire range of metastability, the properties of metallic supercooled liquids are only measureable to within narrow temperature ranges just above the glass transition and just below the melting point.

Recently, a method has been developed which overcomes many of the limitations of these conventional methods by uniformly heating, rheologically softening, and thermoplastically forming metallic glasses rapidly into a net shape using a rapid capacitor discharge forming (RCDF) tool. (See, e.g., U.S. Pat. Pub. No. US-2009-0236017-A1, the disclosure of which is incorporated herein by reference.) The RCDF method utilizes the discharge of electrical energy stored in a capacitor to uniformly and rapidly heat a sample or charge of metallic glass alloy to a predetermined "process temperature" between the glass transition temperature of the amorphous material and the equilibrium melting point of the alloy in a time scale of several milliseconds or less. However, in this method the application of force to shape the heated sample into high quality amorphous bulk articles is done through conventional techniques, which are not optimal.

Accordingly, a need exists to find a novel approach to shape the heated BMG specimen that exploits the electric field generated in the instantaneous RCDF heating method.

SUMMARY OF THE INVENTION

A method of forming metallic glass, sheets, tubes, or rods is disclosed which utilizes an electromagnetic forming force to shape a metallic glass charge in the form of a sheet, tube, or rod of essentially uniform cross section.

In one embodiment, the invention is directed to a method of rapidly heating and shaping an amorphous material using a rapid capacitor discharge and electromagnetic force, and includes:

providing at least one sample of amorphous metal having a substantially uniform cross-section;

discharging a quantum of electrical energy uniformly through each of the samples along an electric field axis to uniformly heat the entirety of said sample to a processing temperature such that the viscosity of the amorphous material lies between about 1 Pa-s to about $10^5$ Pa-s;

applying a static magnetic field transverse to the electric field axis to generate an electromagnetic deformational force to shape the heated sample into an amorphous article; and cooling the article to a temperature below the glass transition temperature of the amorphous material.

In another embodiment, the invention is directed to an apparatus for magnetic forming for rapidly heating and shaping an amorphous metal including:

a sample of an amorphous metal having a substantially uniform cross-section;

a source of electrical energy;

at least two electrodes interconnecting attached to the sample such that substantially uniform connections are formed between said electrodes and said sample, wherein the source of electrical energy is capable of producing a quantum of electrical energy along an electric field axis sufficient to uniformly heat the entirety of said sample to a processing temperature such that the viscosity of the amorphous material lies between about 1 Pa-s to about $10^5$ Pa-s;

a static magnetic field source disposed such that a static magnetic field is produced transverse to the electric field axis; and wherein the static magnetic field in association with the quantum of electric energy is capable of generating an electromagnetic deformational force sufficient to form or shape said heated sample to an article.

In still another embodiment, the quantum of electrical energy is discharged through the electrodes to generate an electrical field along the longitudinal length of the sample.

In yet another embodiment, the quantum of electrical energy is at least about 100 J and a discharge time constant of between about 10 μs and 10 ms.

In still yet another embodiment, the heating and shaping of the sample are complete in a time of between about 100 μs to 1 s.

In still yet another embodiment, the intensity of the quantum of electrical energy is varied during at least one of either the heating and shaping steps. In such an embodiment, the varying includes generating a rapid pre-pulse at the sample prior to discharging more energy at a slower rate, the energy of said pre-pulse being sufficient to uniformly raise the temperature of the sample to above the glass transition of the amorphous material, while the energy discharged at a slower rate is sufficient to interact with the magnetic field to generate an electromagnetic force to sufficiently shape the heated sample.

In still yet another embodiment, the sample has a shape selected from the group consisting of rods, sheets, cylinders, and cubes.

In still yet another embodiment, the magnetic field is disposed in relation to the electric field axis such that the electromagnetic deformational force is formed normal to the axis of the electric field.

In still yet another embodiment, the source of electrical energy is a capacitor.

In still yet another embodiment, the magnetic field is formed by at least one magnetic source selected from the group consisting of permanent magnets and electromagnets, like for example, Helmholtz coils or a Helmholtz coil combined with a high permeability soft magnetic core. In one such embodiment, the permanent magnets are selected from the group consisting of iron-neodymium-boron magnets and samarium-cobalt magnets.

In still yet another embodiment, magnetic field is formed from the combined influence of a plurality of magnetic sources. In one such embodiment, the plurality of magnetic sources are disposed at different angles relative to the electric field axis. In another such embodiment, a shaping tool is disposed in proximity to said sample, the shaping tool having a three-dimensional mold cavity.

In still yet another embodiment, the apparatus and method includes a shaping tool in proximity to the sample such that the deformational force urges the amorphous material into contact with a shaping tool selected from the group consisting of molds, dies, extrusion dies, injection molds, stamps and rollers. In one such embodiment the shaping tool is heated to a temperature preferably around the glass transition temperature of the amorphous material. In another such embodiment, the shaping tool is at least partially formed from a magnetic material.

In still yet another embodiment, the shaping tool is a pair of parallel rollers, and wherein the magnetic field is applied normal to the sample and parallel to a plane defined by the axes of the rollers such that said sample is urged between said rollers to form an amorphous sheet article.

In still yet another embodiment, the apparatus includes confining the sample along at least two axes within a channel formed by a non-conducting containment member and discharging the quantum of energy across the width of the sample such that a deformation force is applied along the length of the sample to create a pressure gradient in the sample such that the heated sample is urged along the channel and injected into a shaping tool. In such an embodiment, the shaping tool is one of either a die or a mold.

In still yet another embodiment, the sample contact surfaces between the electrodes and the sample are flat and parallel.

BRIEF DESCRIPTION OF THE DRAWINGS

The description will be more fully understood with reference to the following figures, which are presented as exemplary embodiments of the invention and should not be construed as a complete recitation of the scope of the invention, wherein.

DETAILED DESCRIPTION OF THE INVENTION

Figure 1:
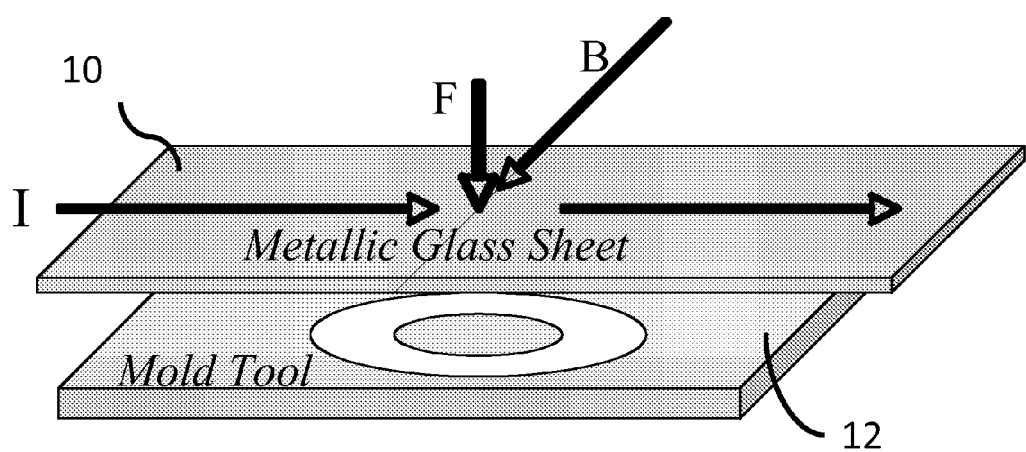
FIG. 1 provides a schematic diagram of the layout and geometry of an embodiment of the electromagnetic forming method of the current invention.

The current invention is directed to a method of uniformly heating, rheologically softening, and thermoplastically forming metallic glasses rapidly (typically with processing times of less than 1 second) into a net shape article using an electromagnetic forming force in conjunction with Joule heating.
Rapid Capacitor Discharge Forming (RCDF)

The method of the current invention utilizes the discharge of electrical energy (typically 100 J to 100 KJ) stored in a capacitor to uniformly and rapidly heat a sample or charge of metallic glass alloy to a predetermined "process temperature" about half-way between the glass transition temperature of the amorphous material and the equilibrium melting point of the alloy in a time scale of several milliseconds or less in combination with a magnetic forming force, and is referred to hereinafter as magnetically enabled rapid capacitor discharge forming (MERCDF). A conventional RCDF process is described in greater detail in U.S. Pat. Pub. No. US-2009-0236017-A1, the disclosure of which is incorporated herein by reference.

The conventional RCDF process proceeds from the observation that metallic glass, by its virtue of being a frozen liquid, has a relatively high electrical resistivity, which can result in high dissipation and efficient, uniform heating of the material at rate such that the sample is uniformly heated over very short time with the proper application of an electrical discharge. By rapidly and uniformly heating a BMG, the RCDF method extends the stability of the supercooled liquid against crystallization to temperatures substantially higher than the glass transition temperature, thereby bringing the entire sample volume to a state associated with a processing viscosity that is optimal for forming. The RCDF process also provides access to the entire range of viscosities offered by the metastable supercooled liquid, as this range is no longer limited by the formation of the stable crystalline phase.

In sum, the RCDF process allows for the enhancement of the quality of parts formed, an increase yield of usable parts, a reduction in material and processing costs, a widening of the range of usable BMG materials, improved energy efficiency, and lower capital cost of manufacturing machines. In addition, owing to the instantaneous and uniform heating that can be attained in the RCDF method, the thermodynamic and transport properties throughout the entire range of the liquid metastability become accessible for measurement.
Magnetic Field Forming The electromagnetic forming of the current invention is to be contrasted with conventional electromagnetic forming (EM forming or magneforming). Conventional EM forming is a type of high velocity, cold forming process for electrically conductive metals, most commonly copper and aluminum. In this process the workpiece is reshaped by high intensity pulsed magnetic fields that induce a current in the workpiece and a corresponding repulsive magnetic field, rapidly repelling portions of the workpiece. During operation, a rapidly changing magnetic field induces a circulating electrical current within a nearby conductor through electromagnetic induction. The induced current creates a corresponding magnetic field around the conductor. Because of Lenz's Law, the magnetic fields created within the conductor and work coil strongly repel each other. The high work coil current (typically tens or hundreds of thousands of amperes) creates an ultrastrong magnetic force that overcomes the room-temperature yield strength of the metal work piece, causing permanent deformation. However, this process requires that the metal be shaped in a cool state.

As discussed, the current invention provides a method of forming metallic glass, sheets, tubes, or rods, which utilizes a metallic glass charge in the form of a sheet, tube, or rod of essentially uniform cross section. During the process, a large current pulse generated by the discharge of a capacitor bank through the length of the sample is used to rapidly and uniformly heat the sample to a target temperature in the supercooled liquid region. Following heating, the heated sample is subjected to an electromagnetic force generated by the interaction of the applied current with a magnetic field oriented normally to the direction of current flow.

FIG. 1, below, shows a schematic illustration of an exemplary geometry used in implementing the invention. In the example geometry used for illustration, the sample (10), which is disposed in a position adjacent to a shaping element (12), such as a mold, injection molding port, roller sheet, etc., is heated by the application of an applied electrical current (I) across the sample. The heated sample is then subjected to an electromagnetic force (F) formed by the applied current (I) of the inductive heating and the transverse magnetic field (B), which in this example is normal to the current. The sample is molded by the resulting electromagnetic force, because the heated sample is a viscous liquid, which deforms under the influence of the electromagnetic force to replicate the shape defined by the shaping element (in the example in FIG. 1, a mold).

It is observed that most metallic glasses are non-magnetic, especially above their glass transition, and therefore it is not obvious that an electromagnetic forming process would operate on them. However, the electromagnetic forming works in these amorphous systems because the metallic glass is simultaneously being heated by generating an electric field across it while present in a transverse magnetic field.

Below is a list of the basic elements that allow for the combined use of capacitive discharges and magnetic fields to carry-out processing and net shape forming of metallic glass materials. To one skilled in the art, it should be apparent that numerous variations are possible within the basic invention, however, for the purposes of disclosure, the invention can be defined and characterized by the following basic elements:

(1) The Sample

A metallic glass charge having an essentially uniform cross section. Although a uniform cross-section is required, it should be understood that any shape with uniform cross section may be used, such as, for example, rods, sheets, cylinders, cubes, etc. Likewise, any metallic glass having an accessible amorphous phase may be used, such as, for example, metallic glasses disclosed in U.S. Pat. Nos. 5,288,344; 5,368, 659; 5,618,359; and 5,735,975, the disclosures of each of which are incorporated herein by reference.

(2) The Electrical Circuit

An electrical capacitor which is used to store and discharge electrical energy by uniform Ohmic dissipation with an electrical current along the length of the sample thereby uniformly heating the sample to a liquid processing temperature above the glass transition temperature of the metallic glass in accordance with U.S. Pat. Pub. No. US-2009-0236017-A1, the disclosure of which is incorporated herein by reference.

(3) The Processing Temperature

A processing temperature chosen to be in a range whereby the viscosity of the glass forming liquid lies between about 1 Pas-s to about $10^5$ Pas-s. It will be understood that methods of determining the temperature necessary to bring any metallic glass within this viscosity range are well-known by those skilled in the art.

(4) The Nature of the Magnetic Field

A static magnetic field applied in the region surrounding the sample that reacts with the time and space dependent current flowing in the sample to produce electromagnetic forces that act on the sample to shape and form the liquid sample into a desired shape. The shaping and forming can be carried out with or without the use of an auxiliary shaping tool, such as, for example, a mold, die, sheet roller, extruder, etc. (Several examples of different shaping took incorporated with the magnetic field shaping process of the current invention are shown in Examples 1 to 6, below.)

(5) The Geometry of the Magnetic Field

Although the magnetic field is static, it may generally vary in space in such a manner as to control the distribution of electromagnetic shaping forces over the sample to produce optimum forming of a net-shape. In particular, although in the basic example provided in FIG. 1, above, the geometry of the magnetic field in relation to the applied current is chosen so that the electromagnetic force applied to the sample is directed normal to the sample and against a die tool or into a mold tool, it should be understood that the force applied to the sample is proportional to the angle of the current and magnetic field in accordance with the Lorentz force equation ($F=I\times B\cdot\sin\theta$). The force pushes against the sample normal to the sample. Accordingly, the magnetic field and electric current can be positioned in relation to each other in any geometry suitable for applying the necessary shaping force to the sample. For example, the field may be produced by a single or multiple permanent magnets arranged in a configuration to produce a desired distribution of forces over the sample. The static magnetic field may also be created all in part by electromagnets. The electromagnets may be used in concert with one or more permanent magnets. The permanent magnets may be of the "Iron-Neodymium-Boron"-type, "Samarium-Cobalt type", or and other common type of permanent magnet. Alternatively, the mold itself could also be fabricated from a magnetic material.

(6) Quenching

Following shaping, the final part is cooled below the glass transition temperature of the metallic glass in a sufficiently short time to avoid substantial crystallization of the part. The final component produced thereby remains in a substantially glassy state. For purposes of definition, the final part should comprise at least 50% metallic glass and less than 50% of any crystallized material. Cooling can be accomplished by any reasonable means, including, for example, thermal conduction to the mold tool, or by conduction, convection, or radiation to the ambient environment surrounding the final net shaped component.

Although one basic embodiment of the MERCDF method of the current invention is described above, as are the basic elements required for using a magnetic field to create electromagnetic "forming" forces in a current carrying metallic glass work piece, it should be understood that the method can be extended to various other geometries and to other forming methods. For example, multiple permanent magnets with high field strength such as Iron Neodymium Born permanent magnets can be use to produce spatially non-uniform permanent fields which interact with the sample current to produce a desired distribution of forming forces on the work-piece. This force distribution acting on the work-piece can be tailored to optimize the net shaping capability of the invention. In addition, since magnetic forces scale with current while heat dissipation in the charge scales quadratically with current, one can also use discharges from multiple capacitors to separately control sample heating and shaping. These variations and others, will be described more thoroughly in the exemplary embodiments presented below.

EXEMPLARY EMBODIMENTS

As examples of the invention that embody the above basic elements, the following exemplary cases of net shape forming from various initial shapes to final useful parts are provided. The examples given here are intended to illustrate several useful variants of the basic invention. All these variants are based on the basic elements of the invention as outlined at the beginning of this section. These variants should all be considered as alternative embodiments of the invention as disclosed in the present document. The invention has many other possible variants which can be implemented by someone skilled in the art using modified geometries as required to produce a suitable arrangement of electromagnetic forces on a capacitive discharge heated work-piece.

Example 1

Molding

As a demonstration of the method in a simple molding case, a thin sheet of metallic glass (Metglas MBF 50—Ni-based brazing alloy) produced by planar flow casting is used. The sheet is in the form of a ribbon of width 1-2", thickness of about 30-40 μm. Such ribbons are commercially available in long lengths from the Metglas Division of Hitachi Metals. A 0.262 Farad capacitor band controlled by a silicon rectifier was used. A simple demonstration die tool was fabricated from a machinable ceramic, Macor. For demonstration, a Macor die of circular symmetry with concentric grooves machined in the surface was chosen as shown in FIGS. 2A to D.

Figure 2:
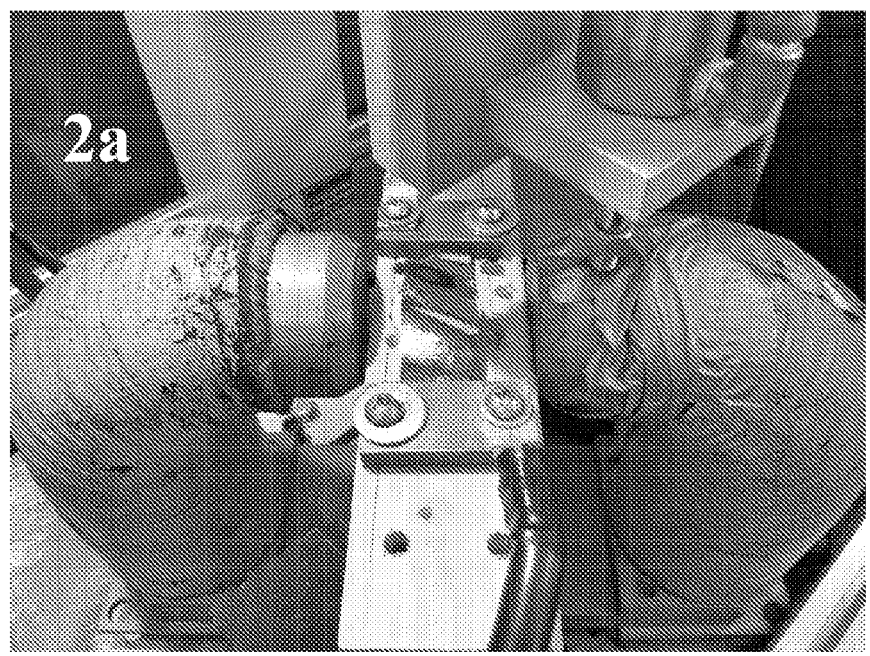
FIGS. 2A to 2D provides a demonstration of electromagnetic molding in accordance with the current invention, where (A) provides an image of the initial set-up prior to discharge showing a 1 inch wide ribbon, copper electrodes and permanent magnet, (B) provides an image of the apparatus following discharge, (C) provides an image of a sheet formed over a Macor mold in accordance with an exemplary embodiment of the current invention, and (D) provides a series of still images showing the process of electromagnetic molding in accordance with the current invention.
Figure 2:
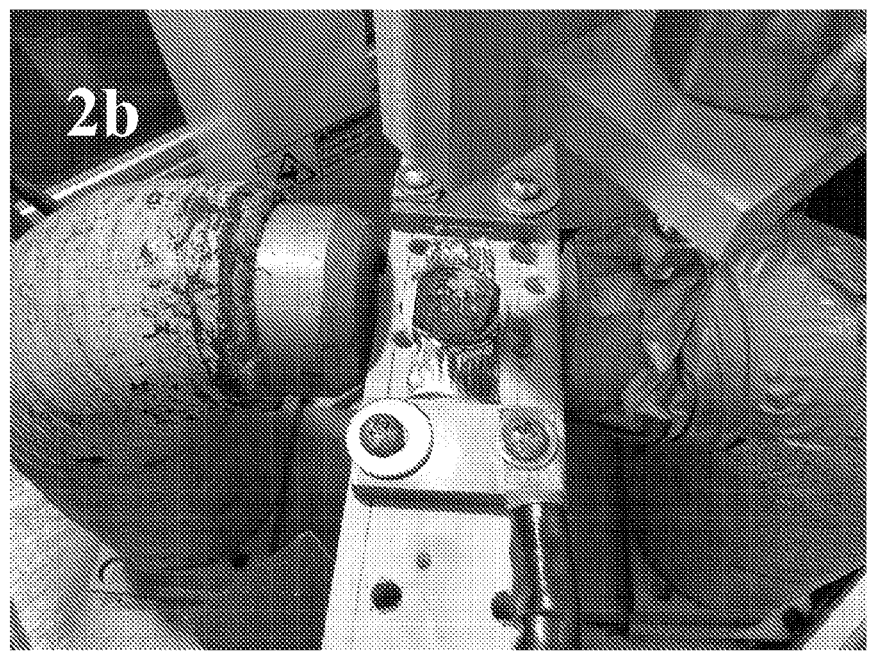
Figure 2C:
Figure 2D:
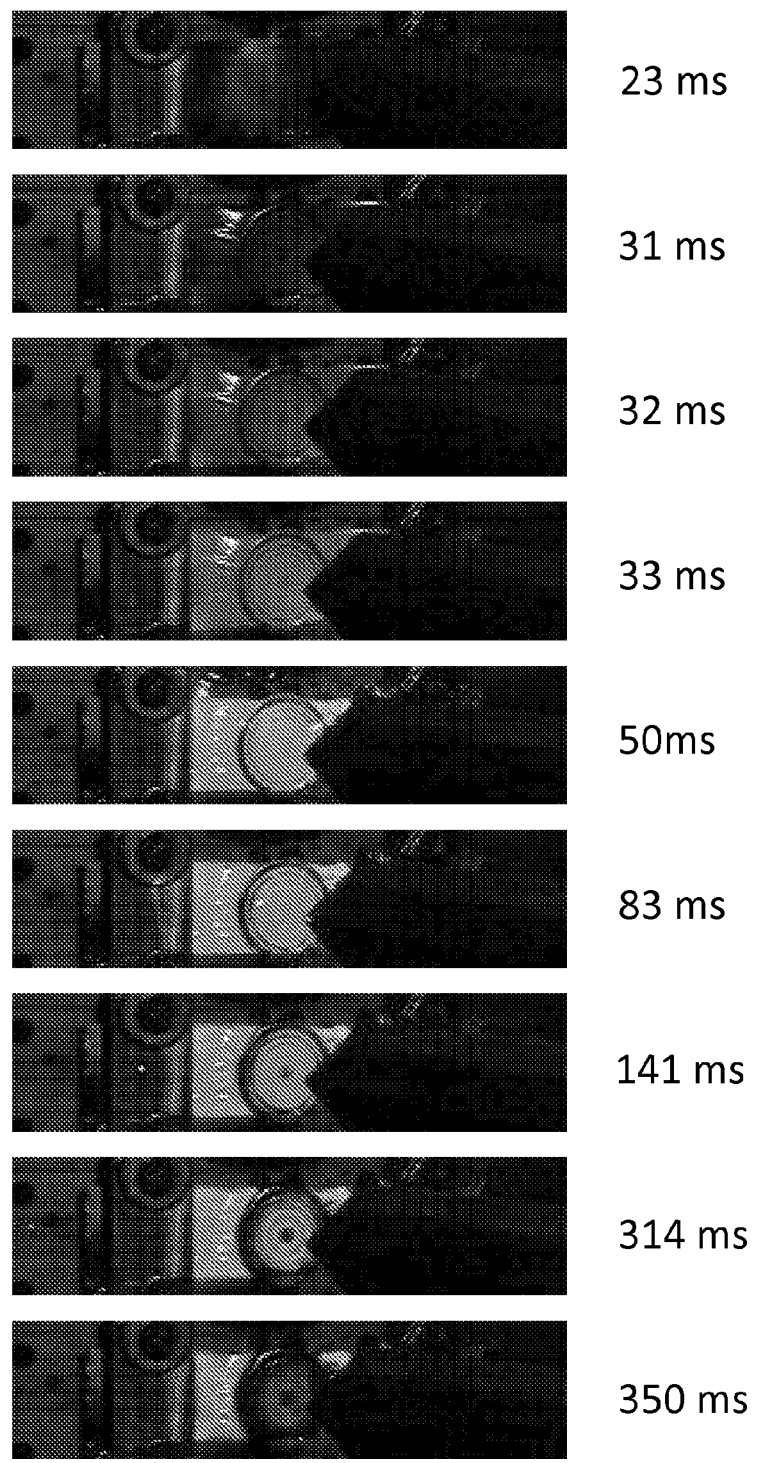

A reasonably homogeneous magnetic field of ~1 kG was applied in the region surrounding the mold and was provided by a permanent magnet as seen in FIGS. 2A and 2B. The capacitor was charged to voltages in the range of 20-40 volts and discharged through copper leads and a copper clamping strip on the ribbon. FIG. 2A shows the original ribbon in the magnetic field prior to discharge. FIG. 2B shows the ribbon as heated in the magnetic field by the capacitive discharge to a process temperature of ~700 C. FIG. 2C shows the shaped ribbon after a total elapsed time of several seconds.

A high speed video movie taken at 1000 frames/s shows that the sample is heated to the process temperature in several milliseconds, formed by dynamic deformation on the mold within about 10 milliseconds following heating, and cooled to ambient temperature after 1-2 seconds total elapsed time. The result, which is shown in a series of stills in FIG. 2D demonstrates a "proof of concept" of the use of an electromagnetic force generated by the interaction of the sample current with a permanent magnetic field to "compressively" forge a sheet into a shaped part.

Example 2

Sheet Forming

Figure 3:
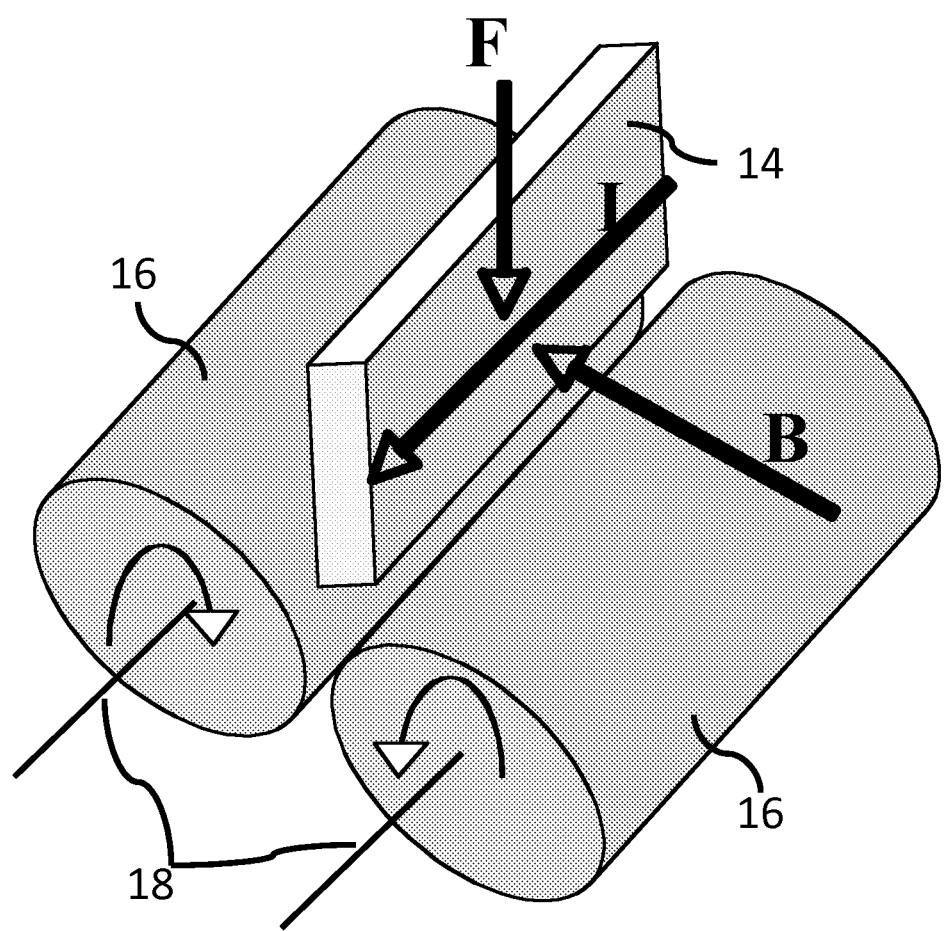
FIG. 3 provides a schematic of an apparatus for the magnetically driven rolling of a heated metallic glass plate to form a sheet in accordance with an embodiment of the invention.

FIG. 3 shows an exemplary set-up for a method of forming sheets from a plate using twin rolls. As shown, in this embodiment an electromagnetic force (F) is exerted on a square or rectangular bar (14) of metallic glass located above the gap between two rotating rollers (16). The electrical discharge (I) is transferred to the sample by electrodes (not shown), which contact the ends of the bar (14). Current is induced along the length of the bar. A static magnetic field (B) is applied normal to the bar (14) and parallel to the plane defined by the two axes (18) of the twin rollers (16). The electromagnetic force drives the heated bar into the gap between the rollers to produce a rolled sheet. The bar may be contained in a vertical channel (not shown) made of electrically non-conducting material in order to confine and efficiently guide the material through the rollers.

Example 3

Injection Molding & Extrusion of a Net-Shaped Component

Figure 4:
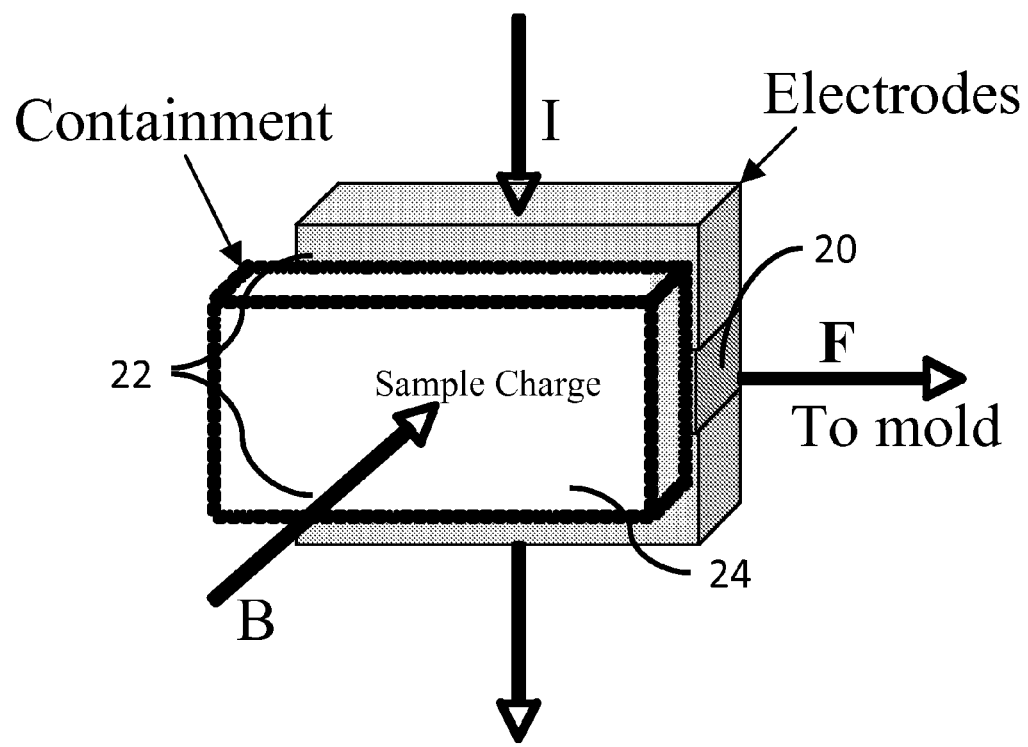
FIG. 4 provides a schematic of an electromagnetic force generated by a permanent magnetic field to carry out injection molding of a confined charge into a mold tool in accordance with an embodiment of the invention.

In another embodiment, the basic method may be used to injection mold a square rod into a mold cavity of net-shape. As shown in FIG. 4, in this embodiment an electromagnetic force (F) can be used to create a pressure gradient along the length of a metallic glass sample (20) during discharge heating of the rod by a current (I) across its width provided by two bar shaped electrodes (22). To prevent leakage, the charge is confined by non-conducting containment walls (24). A mold tool with suitable gating and mold cavity can be provided (not shown) that would then be filled by the injected liquid as it is heated to a suitable process temperature (as described above).

Alternatively, the same set-up can be used for a method of extrusion of a net-shaped component of uniform cross-section using an extrusion die. In this embodiment, the apparatus is used to force a heated charge of metallic glass through an extrusion die. In this case, the die would be located at the location of the mold in FIG. 4.

Example 4

Multiple Magnet Forming

In another embodiment, multiple magnets may be used to form a sheet into the form of a box-shaped "case" in the form of a rectangular solid having width and length larger than depth. As described above, it will be understood that a suitable configuration of multiple permanent magnets can be used to generate a distribution of forces on a work-piece, which can be tailored to shape the piece into a mold cavity of three dimensional shape such as a box shaped, ring shaped, spherical shaped, or other desired shape.

Example 5

Joining and Bonding of Components

Figure 5:
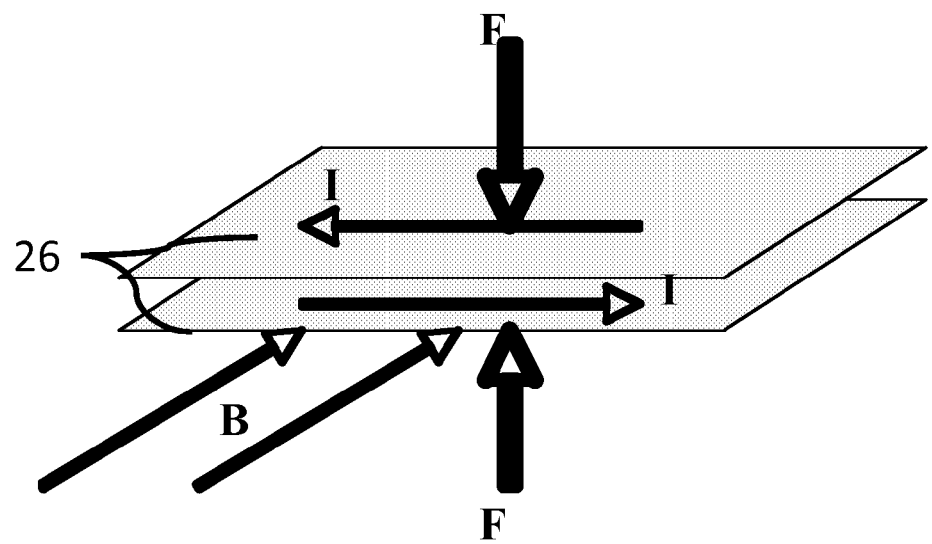
FIG. 5 provides a schematic of an apparatus geometry appropriate for discharge heating electromagnetic forces to bond adjacent sheets in accordance with an embodiment of the invention.

Two components (sheets, bars, plates) may be heated by a capacitive discharge, simultaneously using the method of the current invention. If the direction of current flow in the two components is reversed, then the electromagnetic force can be used to drive the two components into contact. An example of this geometry is illustrated in FIG. 5. As shown, when the two strips (26) are heated by capacitive discharges (I) that have opposite current flow to an appropriate process temperature, an electromagnetic force (F) is uniformly exerted over the two surfaces, the two pieces may be driven together and joined or bonded.

After joining, the pieces may be quenched below the glass transition temperature using any suitable method, such as via conduction or convection to a suitable fluid, or via radiation to the surroundings. For example, in one embodiment the outer surfaces of the pieces could be exposed to a stream or reservoir of a gas or liquid, such as, for example, helium gas or a suitable oil bath.

Example 6

Current Profile Shaping

Figure 6:
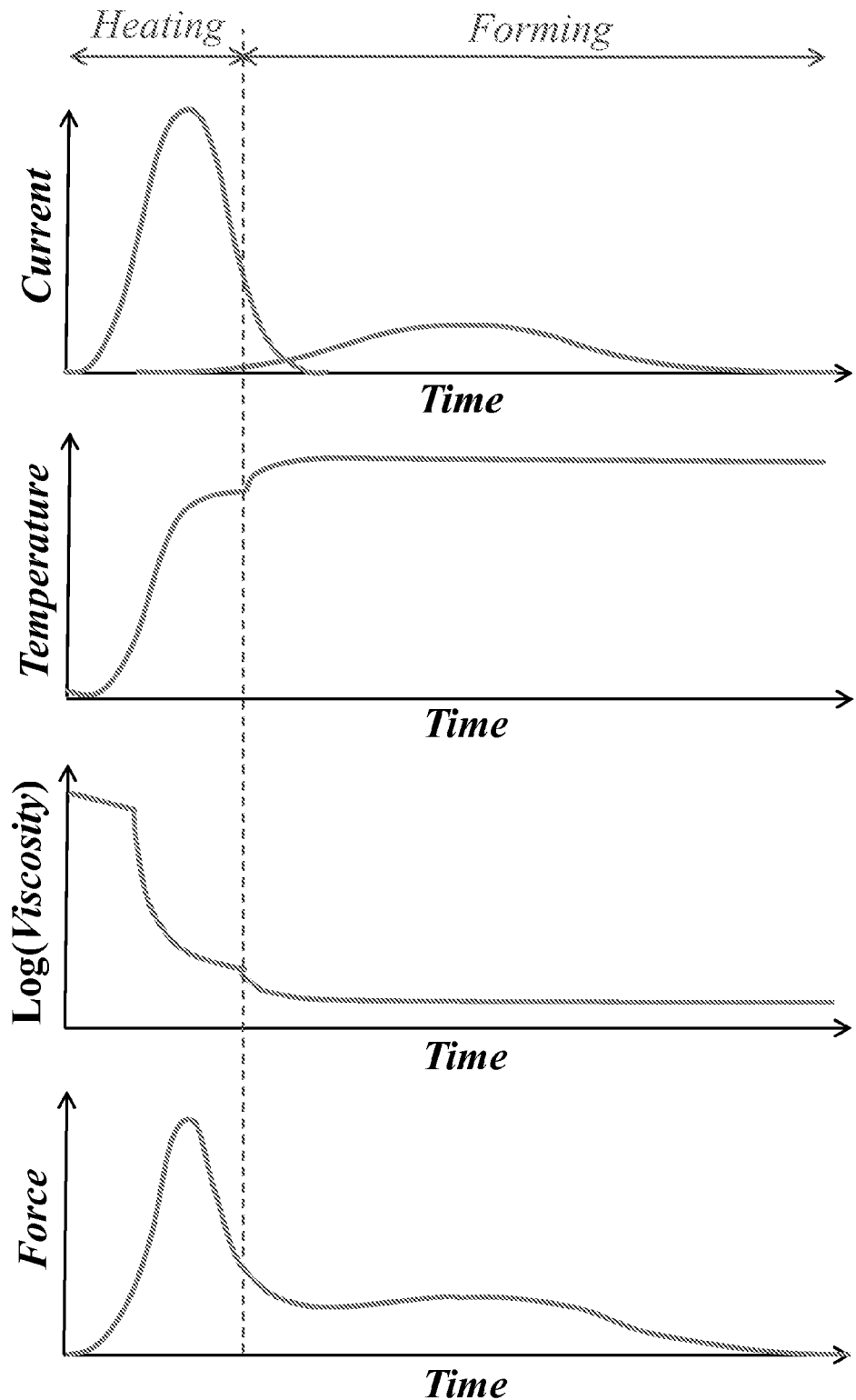
FIG. 6 provides a schematic data plot of a tailored current profile comprising two successive pulses of different intensity and duration in accordance with an embodiment of the invention.

Because heating and forming are essentially coupled in the present method, the profile of the current may be tailored such that the heating and forming stages are effectively decoupled. In one embodiment for example, it is preferable to first apply a high intensity short duration current pulse first, followed by a second low intensity long duration pulse. As the rate of heating is related quadratically to the current ($\sim I^2$) while the force is related linearly to current ($\sim I$), the vast majority of the heating will take place during the first high-intensity short-duration current pulse, while the vast majority of forming will take place during the second low-intensity long-duration current pulse. Specifically, the first pulse will be utilized to rapidly and uniformly raise the sample temperature to above the glass-transition temperature at which point the viscosity of the sample begins to drop. Even though the high current of the first pulse will induce a high force, this force will not produce substantial forming because the sample viscosity will be fairly high for the majority of the duration of the first pulse. The second pulse with much lower intensity but much longer duration will result in only slightly further heating compared to the first pulse, because heating is proportional to $\sim I^2$. As force is proportional to $\sim I$, however, the second pulse will induce a force not much smaller than that in the first pulse, applied over a much longer time during which the sample viscosity is much lower, thereby contributing to much more forming. This embodiment is demonstrated graphically in FIG. 6.

In the embodiment described above, the magnetic field could be induced by electronically activating an electromagnet, like for example, a Helmholtz coil, in synchrony with the discharge of the additional quantum of energy. As such, heating and forming are more effectively decoupled, as no force will be induced during the first current pulse such that it is utilized solely for heating.

DOCTRINE OF EQUIVALENTS

Those skilled in the art will appreciate that the foregoing examples and descriptions of various preferred embodiments of the present invention are merely illustrative of the invention as a whole, and that variations in the steps and various components of the present invention may be made within the spirit and scope of the invention. For example, it will be clear to one skilled in the art that additional processing steps or alternative configurations would not affect the improved properties of the method/apparatus of the current invention nor render the method/apparatus unsuitable for its intended purpose. Accordingly, the present invention is not limited to the specific embodiments described herein but, rather, is defined by the scope of the appended claims.

What is claimed is:

1. A method of rapidly heating and shaping an amorphous metal using electrical energy discharge in the presence of a magnetic field generating an electromagnetic force comprising:

providing at least one sample of amorphous metal, said sample having a substantially uniform cross-section;

discharging a quantum of electrical energy uniformly through each of said samples along an electric field axis to uniformly heat the sample to a liquid processing temperature above the glass transition temperature of the metallic glass;

applying a magnetic field transverse to the electric field axis to generate an electromagnetic deformational force to shape the heated sample to form an article; and cooling said article to a temperature below the glass transition temperature of the amorphous metal to produce an amorphous article.

2. The method of claim 1, wherein the step of discharging said quantum of electrical energy occurs through at least two electrodes connected to opposite ends of each of said at least one samples and generates an electrical field along the longitudinal length of said sample.

3. The method of claim 1, wherein the quantum of electrical energy is delivered by discharging a capacitor.

4. The method of claim 1, wherein the quantum of electrical energy is at least about 100 Joules and a discharge time constant of between about 10 µs and 10 ms.

5. The method of claim 1, wherein the heating and shaping of the sample are complete in a time of between about 100 µs to 1 s.

6. The method of claim 1, further comprising varying the intensity of the quantum of electrical energy during at least one of either the heating and shaping steps.

7. The method of claim 6, wherein the step of varying includes generating a pre-pulse at the sample prior to discharging an additional quantum of energy at a first rate;

the energy of said pre-pulse being sufficient to raise the temperature of the sample to above the glass transition of the amorphous metal; and the additional quantum of energy being discharged at a rate slower than the rate of said pre-pulse with an energy sufficient to interact with the magnetic field to generate an electromagnetic force sufficient to shape the heated sample.

8. The method of claim 1, wherein the magnetic field is induced by activating an electromagnet in synchrony with the discharge of the additional quantum of energy.

9. The method of claim 1, wherein the sample has a shape selected from the group consisting of rods, sheets, cylinders, and cubes.

10. The method of claim 1, wherein the magnetic field is disposed in relation to the electric field axis such that the electromagnetic deformational force is formed normal to the axis of the electric field.

11. The method of claim 1, wherein the magnetic field is formed by at least one magnetic source selected from the group consisting of permanent magnets and electromagnets.

12. The method of claim 11, wherein the permanent magnets are selected from the group consisting of iron-neodymium-boron magnets and samarium-cobalt magnets.

13. The method of claim 1, wherein the magnetic field is formed from the combined influence of a plurality of magnetic sources.

14. The method of claim 13, wherein the plurality of magnetic sources are disposed at different angles relative to the electric field axis.

15. The method of claim 13, further comprising providing a shaping tool in proximity to said sample, the shaping tool having a three-dimensional mold cavity.

16. The method of claim 1, further comprising providing a shaping tool in proximity to said sample such that the deformational force urges the heated amorphous metal into contact with a shaping tool selected from the group consisting of molds, dies, extrusion dies, injection molds, stamps and rollers.

17. The method of claim 16, wherein the shaping tool is heated to a temperature preferably around the glass transition temperature of the amorphous metal.

18. The method of claim 16, wherein the shaping tool is at least partially formed from a magnetic material.

19. The method of claim 16, wherein the shaping tool is a pair of parallel rollers, and wherein the magnetic field is applied normal to the sample and parallel to a plane defined by the axes of the rollers such that said sample is urged between said rollers to form an amorphous sheet article.

20. The method of claim 16, further comprising providing an elongated sample;

confining the sample along at least two axes within a channel formed by a non-conducting containment member;

discharging the quantum of energy across the width of the sample; and generating an electromagnetic deformational force along the length of the sample to create a pressure gradient in the sample such that the heated sample is urged along the channel and injected into a shaping tool.

* * * * *